3,329,727
OXIDATION OF AROMATIC HYDROCARBONS
James J. Louvar, Riverside, Ill., assignor to Universal Oil Products Company, Des Plaines, Ill., a corporation of Delaware
No Drawing. Filed May 9, 1963, Ser. No. 279,324
20 Claims. (Cl. 260—610)

This invention relates to an improved method of preparing the hydroperoxide oxidation product of an alkyl substituted aromatic hydrocarbon. More particularly, this invention relates to the oxidation of an alkyl substituted aromatic hydrocarbon with oxygen or an oxygen-containing gas wherein at least one alkyl substituent of the said hydrocarbon contains a tertiary carbon atom in a position alpha to the aromatic nucleus.

The hydroperoxide oxidation product of various hydrocarbons can be prepared by direct liquid phase oxidation of the hydrocarbon with oxygen or an oxygen-containing gas at an elevated temperature. The reaction proceeds slowly through an initial induction period, accelerating to a more favorable rate with the formation of the hydroperoxide which exerts a catalytic effect on the reaction. This initial induction period is eliminated, or substantially reduced, by initially including a hydroperoxide in the reaction mixture, usually the hydroperoxide of the hydrocarbon being treated. However, other materials have been disclosed in the art which exhibit a similar catalytic effect.

In order to continue the oxidation reaction at a suitable rate it is the general practice to include in the reaction mixture an alkaline promoter, many of which have been previously disclosed, including alkali and alkaline earth metal hydroxides, alkali and alkaline earth metal salts of organic acids, etc. It is considered that the inclusion of the alkaline promoter in the reaction mixture obviates decomposition of the hydroperoxide oxidation product by acidic materials formed during the course of the oxidation reaction.

The alkaline promoters have heretofore been utilized as a suspension in the reaction mixture, or as an aqueous solution in admixture therewith, or as a salt soluble in the reaction mixture, the manner of utilization in any particular case being determined by the nature of the alkaline promoter utilized. It is considered that oxidation of alkyl substituted aromatic hydrocarbons as herein contemplated, proceeds through an anionic oxidation process accelerated by relatively high concentrations of alkaline promoter in the oxidation reaction mixture. However, the inclusion of any substantial amount of alkaline promoter in the reaction mixture as a suspension therein, or as an aqueous solution in admixture therewith, or in solution therewith, requires provision for subsequent separation from the oxidation reaction mixture.

It is an object of this invention to present a method of preparing the hydroperoxide oxidation product of an alkyl substituted aromatic hydrocarbon by oxidation of said hydrocarbon with oxygen or oxygen-containing gas in the presence of a novel and useful alkaline promoter.

It is another object of this invention to prepare the hydroperoxide oxidation product of said hydrocarbon in the presence of an alkaline promotor which is stable at oxidation reaction conditions over extended periods of operation and precludes subsequent separation procedures to recover the oxidation reaction mixture therefrom.

In one of its broad aspects, the present invention embodies a method of preparing the hydroperoxide oxidation product of an alkyl substituted aromatic hydrocarbon which comprises contacting said hydrocarbon with an oxygen-containing gas at oxidation reaction conditions in the presence of a metal of Groups I and II in combined form with an acid-acting refractory metal oxide.

Other objects and embodiments of this invention will become apparent in the further detailed description.

The method of this invention concerns the oxidation of alkyl substituted aromatic hydrocarbons, for example, ethylbenzene, propylbenzene, butylbenzene, isobutylbenzene, isoamylbenzene, 1-ethylnaphthylene, 9-ethylanthracene, 1-ethylphenanthrene, and the like. The method of this invention particularly concerns the oxidation of teritary alkyl aromatic hydrocarbons containing a tertiary carbon atom in a position alpha to the aromatic nucleus. Thus, tertiary alkyl aromatic hydrocarbons like 2-isopropylnaphthylene, 1,1-diphenylethane, etc., and especially teritary alkyl benzenes such as cumene, p-cymene, p-diisopropylbenzene, p-t-butylisopropylbenzene, and the like, are oxidized to their corresponding hydroperoxides, i.e. 2-isopropylnaphthylene, hydroperoxide, 1,1-diphenylethane hydroperoxide, cumene hydroperoxide, p-cymene hydroperoxide, p-diisopropylbenzene dihydroperoxide, p-t-butylisopropylbenzene hydroperoxide, etc. The hydroperoxidoxidation product of tertiary alkyl aromatic hydrocarbons, of which the above are illustrative, may be represented by the general formula

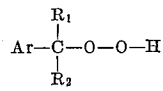

wherein Ar represents an aromatic hydrocarbon radical which may be an aryl or an alkylaryl radical, and the hydroperoxy group (—O—O—H) is attached to a tertiary carbon atom which is in turn attached to the aromatic nucleus by a single bond, and $R_1$ and $R_2$ may be the same or different hydrocarbon radicals selected from the group consisting of alkyl, cycloalkyl, aryl, aralkyl and alkaryl hydrocarbon radicals.

Oxidation reaction conditions applicable to the method of this invention have heretofore been disclosed in the art. Thus, the aromatic hydrocarbon charge is contacted with oxygen, or an oxygen-containing gas such as air, under conditions at which at least a substantial part of the hydrocarbon charge is in the liquid phase. Temperatures effecting oxidation of the herein described alkyl substituted aromatic hydrocarbons comprise, for example, those ranging from about room temperature to about the boiling point of the hydrocarbon being utilized, which in the case of cumene is about 152° C. In general, it is preferred to utilize a temperature of from about 50° C. to about 130° C. Higher or lower temperatures may nevertheless be utilized without exceeding the scope of this invention. The optimum temperature in any particular case will depend on the specific hydrocarbon being oxidized and the specific operating conditions employed. Atmospheric pressure, or slightly subatmospheric pressure, or superatmospheric pressures of up to about 500 p.s.i. or more are generally satisfactory. It is desirable to limit contact time of the hydrocarbon charge and the oxidizing gas in order to effect substantially less than complete conversion of the hydrocarbon charge. For example, in the oxidation of cumene to cumene hydroperoxide it is desirable to limit contact time so that not more than about 30% of the hydrocarbon charge is converted to the hydroperoxide.

In accordance with the present invention, an alkyl substituted aromatic hydrocarbon is oxidized with oxygen or an oxygen-containing gas in the presence of an alkaline promoter consisting of a metal of Groups I and II in combined form with an acid-acting refractory metal oxide. The metal of Groups I and II, for example, lithium. sodium, potassium, rubidium, cesium, beryllium, magnesium, calcium, strontium, barium, etc., is associated with the acid-acting refractory metal oxide in what is known in the art as the combined form of said metal.

The metal is thus combined with the refractory metal oxide by chemi-sorption, in contrast to physical sorption as is frequently the case when depositing or impregnating carrier materials with a catalytic component, to form an alkaline promoter which is stable at oxidation reaction conditions. In one embodiment of this invention the preferred alkaline promoter comprises potassium in combined form with an acid-acting refractory metal oxide. Still another embodiment of this invention relates to magnesium in combined form with an acid-acting refractory metal oxide.

Suitable refractory metal oxides include the naturally occurring bauxite, kaolin or bentonite clay which may or may not have been acid treated, also diatomaceous earth such as kieselguhr, montmorillinite, etc., and spinels such as magnesia spinels, or zinc oxide spinels, and the like. Synthetically prepared refractory metal oxides, for example, alumina, silica, boria, thoria, titania, zirconia, etc., as well as combinations thereof such as a silica-alumina composite, a silica-zirconia composite, an alumina-boria composite, and the like, are also suitable. A synthetically prepared alumina has been found to be particularly suitable as has a synthetically prepared silica-alumina composite.

The aforesaid alkaline promoters can be prepared by any conventional or convenient method. One suitable method of preparation involves the impregnation of the selected refractory metal oxide with a decomposable salt of a metal of Groups I and II. This impregnated refractory metal oxide is dried and thereafter calcined at a temperature at least as high as decomposition temperature of the aforesaid salt to yield a final alkaline promoter comprising a metal of Groups I and II in combined form with the selected refractory metal oxide. For example, alumina is impregnated with magnesium acetate from an aqueous solution thereof and the resulting composite heated at a temperature of at least 323° C. to yield magnesium in combined form with alumina. Potassium nitrate, potassium carbonate, potassium chlorate, sodium nitrate, sodium chlorate, sodium carbonate, lithium carbonate, lithium chlorate, rubidium carbonate, cesium carbonate, cesium nitrate, beryllium sulfate, calcium carbonate, barium nitrate, and the like are representative of decomposable salts suitable for use in the above method of preparation.

The amount of Group I and II metal which can be effectively utilized in combined form is dependent in each case upon the ability of the selected refractory metal oxide to combine with said metal. In general, an alkaline promoter wherein the combined metal comprises from about 5 wt. percent to about 20 wt. percent or more of the final alkaline promoter will effectively promote the oxidation of alkyl substituted aromatic hydrocarbons as herein contemplated.

The following examples are presented in further illustration of the method of this invention. It is not intended that said examples shall serve as an undue limitation on the generally broad scope of this invention as set out in the appended claims.

*Example I*

49 grams of calcined alumina was immersed in an aqueous solution consisting of 14.1 grams of potassium nitrate in 100 cubic centimeters of water. The immersed alumina was heated to dryness in a rotary steam drier and the resulting composite further dried in an oven at 115° C. for four hours. The oven-dried composite was thereafter heated at 550° C. for four hours in a stream of nitrogen and the potassium carbonate decomposed.

2 grams of the above described alkaline promoter was added to 95 grams of cumene together with 1.75 grams of 75% cumene hydroperoxide. Air was bubbled through the sample at about 300 cubic centimeters per minute at a temperature of 115° C. The sample was periodically examined for cumene hydroperoxide by iodimetric analysis. A 28% conversion of cumene to cumene hydroperoxide is effected in a five hour period. The reaction mixture is readily separated from the solid promoter substantially free of potassium salts and secondary reaction products. Cumene hydroperoxide was also prepared in substantially the same manner but in the absence of any promoter. A comparison of results is tabulated below indicating the increased reaction rate resulting from the use of the herein described alkaline promoter.

| Time (Hrs.) | Percent Conversion of Cumene to Cumene Hydroperoxide | |
|---|---|---|
| | Potassium-Alumina | No Promoter |
| 1 | 5 | 4 |
| 2 | 10 | 7 |
| 3 | 16 | 11 |
| 4 | 23 | 15 |
| 5 | 28 | 21 |

*Example II*

An alkaline promoter consisting of potassium in combined form with a silica-alumina composite is prepared by immersing calcined silica-alumina, comprising about 75 weight percent silica and 25 weight percent alumina, in a solution of 14 grams of potassium nitrate in 100 cubic centimeters of water in a rotary steam dryer. The mixture is evaporated to dryness in the rotating dryer. The dried pills, impregnated with potassium nitrate, are thereafter heated in a nitrogen atmosphere at about 550° C. and the potassium nitrate is thereby decomposed. The alkaline promoter thus prepared contains about 9 weight percent potassium in combined form with the silica-alumina composite.

The oxidation of about 100 grams of cumene to cumene hydroperoxide is effected at an increased rate on bubbling air therethrough in the presence of about 2 grams of the above described alkaline promoter at a temperature of 115° C., said air being charged at approximately 300 cubic centimeters per minute. A reaction mixture substantially free of secondary reaction products is readily separated from the reaction mixture.

The method of this invention is preferably carried out in a continuous type of operation. For example, cumene is continuously charged to a reactor maintained at the prescribed temperature and containing the alkaline promoter disposed in a fixed bed therein, or the alkaline promoter may be maintained in a state of turbulence under hindered settling conditions. The cumene is charged through the reactor in admixture with air introduced counter-current to the cumene flow, or concurrently therewith. The reactor effluent, comprising the hydroperoxide oxidation product and cumene, is withdrawn from the reactor at a rate which will insure up to about a 30% conversion of the cumene to the hydroperoxide. Unreacted cumene is distilled from the hydroperoxide oxidation product and recycled as a portion of the charge.

I claim as my invention:

1. A method of preparing the hydroperoxide oxidation product of an alkyl substituted aromatic hydrocarbon which comprises oxidizing said hydrocarbon with an oxygen-containing gas in the presence of metal of Groups I and II in chemical combination with an acid-acting refractory metal oxide, said chemical combination having been prepared by impregnating said oxide with a decomposable salt of said metal and calcining the impregnated oxide at a temperature at least as high as the decomposition temperature of said salt.

2. The method of claim 1 further characterized in that said alkyl substituted aromatic hydrocarbon is a tertiary alkyl aromatic hydrocarbon.

3. The method of claim 1 further characterized in that said alkyl substituted aromatic hydrocarbon is an alkylbenzene.

4. The method of claim 1 further characterized in that said alkyl substituted aromatic hydrocarbon is a tertiary alkylbenzene.

5. A method of preparing a hydroperoxide oxidation product of an alkylbenzene which comprises oxidizing said alkylbenzene with an oxygen-containing gas in the presence of an alkali metal in chemical combination with an acid-acting refractory metal oxide, said chemical combination having been prepared by impregnating said oxide with a decomposable salt of said metal and calcining the impregnated oxide at a temperature at least as high as the decomposition temperature of said salt.

6. The method of claim 5 further characterized in that said alkylbenzene is a tertiary alkylbenzene.

7. A method of preparing the hydroperoxide oxidation product of an alkylbenzene which comprises oxidizing said alkylbenzene with an oxygen-containing gas in the presence of an alkaline earth metal in chemical combination with an acid-acting refractory metal oxide, said chemical combination having been prepared by impregnating said oxide with a decomposable salt of said metal and calcining the impregnated oxide at a temperature at least as high as the decomposition temperature of said salt.

8. The method of claim 7 further characterized in that said alkylbenzene is a tertiary alkylbenzene.

9. A method of preparing the hydroperoxide oxidation product of an alkylbenzene which comprises oxidizing said alkylbenzene with an oxygen-containing gas in the presence of an alkali metal in chemical combination with alumina, said chemical combination having been prepared by impregnating alumina with a decomposable salt of said metal and calcining the impregnated alumina at a temperature at least as high as the decomposition temperature of said salt.

10. The method of claim 9 further characterized in that said alkylbenzene is a tertiary alkylbenzene.

11. A method of preparing the hydroperoxide oxidation product of an alkylbnzene which comprises oxidizing said alkylbenzene with an oxygen-containing gas in the presence of an alkaline earth metal in chemical combination with alumina, said chemical combination having been prepared by impregnating alumina with a decomposable salt of said metal and calcining the impregnated alumina at a temperature at least as high as the decomposition temperature of said salt.

12. The method of claim 11 further characterized in that said alkylbenzene is a tertiary alkylbenzene.

13. A method of preparing the hydroperoxide oxidation product of an alkylbenzene which comprises oxidizing said alkylbenzene with an oxygen-containing gas in the presence of an alkali metal in chemical combination with silica-alumina, said chemical combination having been prepared by impregnating silica-alumina with a decomposable salt of said metal and calcining the impregnated silica-alumina at a temperature at least as high as the decomposition temperature of said salt.

14. The method of claim 13 further characterized in that said alkylbenzene is a tertiary alkylbenzene.

15. A method of preparing the hydroperoxide oxidation product of an alkyl benzene which comprises oxidizing said alkylbenzene with an oxygen-containing gas in the presence of an alkaline earth metal in chemical combination with silica-alumina, said chemical combination having been prepared by impregnating silica-alumina with a decomposable salt of said metal and calcining the impregnated silica-alumina at a temperature at least as high as the decomposition temperature of said salt.

16. The method of claim 15 further characterized in that said alkylbenzene is a tertiary alkylbenzene.

17. A method of preparing the hydroperoxide oxidation product of isopropylbenzene which comprises oxidizing said isopropylbenzene with air in the presence of potassium in chemical combination with alumina, said chemical combination having been prepared by impregnating alumina with a decomposable salt of potassium, and calcining the impregnated alumina at a temperature at least as high as the decomposition temperature of said salt.

18. A method of preparing the hydroperoxide oxidation product of isopropylbenzene which comprises oxidizing said isopropylbenzene with air in the presence of potassium in chemical combination with silica-alumina, said chemical combination having been prepared by impregnating silica-alumina with a decomposable salt of potassium and calcining the impregnated silica-alumina at a temperature at least as high as the decomposition temperature of said salt.

19. A method of preparing the hydroperoxide oxidation product of isopropylbenzene which comprises oxidizing said isopropylbenzene with air in the presence of magnesium in chemical combination with alumina, said chemical combination having been prepared by impregnating alumina with a decomposable salt of magnesium and calcining the impregnated alumina at a temperature at least as high as the decomposition temperature of said salt.

20. A method of preparing the hydroperoxide oxidation product of isopropylbenzene which comprises oxidizing said isopropylbenzene with air in the presence of magnesium in chemical combination with silica-alumina, said chemical combination having been prepared by impregnating silica-alumina with a decomposable salt of magnesium and calcining the impregnated silica-alumina at a temperature at least as high as the decomposition temperature of said salt.

References Cited

UNITED STATES PATENTS

| | | | |
|---|---|---|---|
| 2,776,999 | 1/1957 | Joris | 260—610 |
| 2,779,742 | 1/1957 | Emmett | 252—457 |
| 2,813,907 | 11/1957 | Vluyter | 260—610 |
| 2,861,945 | 11/1958 | Kearby et al. | 252—457 |
| 2,981,751 | 4/1961 | Keith | 252—454 |

LEON ZITVER, *Primary Examiner.*